United States Patent [19]
Freche et al.

[11] Patent Number: 6,162,842
[45] Date of Patent: Dec. 19, 2000

[54] RADIATION CURABLE COATING COMPOSITION

[75] Inventors: Patrick Andre Roger Freche, Limours; Franck Constant Emile Duval, Saint Michel sur Orge, both of France

[73] Assignee: The Goodyear Tire & Rubber Company, Akron, Ohio

[21] Appl. No.: 09/313,450

[22] Filed: May 18, 1999

[51] Int. Cl.[7] ................................. C08F 2/48; C08F 2/50
[52] U.S. Cl. .................. 522/120; 522/114; 522/121; 522/122; 522/142; 522/143; 522/102; 522/95; 522/96; 522/93
[58] Field of Search ..................... 522/120, 122, 522/121, 142, 143, 114, 129, 116, 130, 102, 95, 96, 93

[56] References Cited

U.S. PATENT DOCUMENTS

| | | | |
|---|---|---|---|
| 5,202,361 | 4/1993 | Zimmerman et al. | 522/120 |
| 5,459,174 | 10/1995 | Merrill et al. | 522/35 |
| 5,712,324 | 1/1998 | Lilly | 522/75 |
| 5,756,584 | 5/1998 | Bennett et al. | 525/205 |
| 5,847,015 | 12/1998 | Tajima et al. | 522/75 |
| 5,883,149 | 3/1999 | Bennett et al. | 522/120 |
| 6,001,936 | 12/1999 | Barrera et al. | 525/454 |

*Primary Examiner*—Samuel A. Acquah
*Assistant Examiner*—Sanza L. McClendon
*Attorney, Agent, or Firm*—Alvin T Rockhill

[57] ABSTRACT

This invention discloses a radiation curable coating composition which is comprised of (1) a crosslinked polymeric resin which is comprised of repeat units which are derived from (a) at least one member selected from the group consisting of acrylate monomers and vinyl aromatic monomers and (b) a crosslinking monomer; (2) an acrylate diluting monomer; and (3) a photocatalyst. The subject invention further discloses a process for coating a three-dimensional substrate which comprises applying a radiation curable coating composition to the surface of the substrate and subsequently exposing the surface of the substrate to radiation to cure the coating onto the surface of the substrate, wherein the radiation curable coating composition which is comprised of (1) a crosslinked polymeric resin which is comprised of repeat units which are derived from (a) at least one member selected from the group consisting of acrylate monomers and vinyl aromatic monomers and (b) a crosslinking monomer; (2) an acrylate diluting monomer; and (3) a photocatalyst.

15 Claims, No Drawings

RADIATION CURABLE COATING COMPOSITION

BACKGROUND OF THE INVENTION

Radiation curable coatings are currently being used in a wide variety of applications. It is desirable to use radiation curable coating systems because the need for conventional solvents is eliminated. This is, of course, highly beneficial because there are increasing demands to eliminate volatile organic compounds (VOC) from coating systems. Energy savings are also a strong driving force behind the use of radiation curable coating systems. Radiation curable coating systems also offer an advantage in that they can be applied to virtually any type of substrate. For instance, radiation curable coatings can be applied to plastic, glass, textile fabrics, leather, metal, paper, wood and a variety of other types of substrates.

Conventional radiation curable coating systems are comprised of an acrylic diluting monomer, an acrylic oligomer and a photocatalyst. Such conventional radiation curable coating systems typically have the rheological properties of a Newtonian fluid. Thus, they cannot typically be applied to substrates in non-horizontal or vertical applications or in thick layers. This is because such coatings have a tendency to run or sag before they can be cured. This has limited the used to radiation curable coatings to applications where they can be applied to the horizontal surface of substrates in relatively thin layers. It has accordingly precluded them from being used in coating three-dimensional objects. Furthermore, the rheological properties of conventional radiation curable coatings has limited the means by which they can be applied to substrates in industrial applications.

A means to modify the rheological properties of radiation curable coating compositions would be highly desirable. Such a technique could be used to make non-horizontal applications, spray applications or dip applications of radiation curable coatings possible. The ability to make thick coatings and to coat porous surfaces, such as paper, with minimal penetration into the substrate could also be achieved.

SUMMARY OF THE INVENTION

This invention discloses a radiation curable coating system having pseudo plastic rheological behavior. This radiation curable coating system offers a number of important advantages. For instance, the radiation curable coating system of this invention offers excellent sag resistance and can be applied to three-dimensional substrates or to substrates that are in an orientation that is non-horizontal or even vertical with respect to the surface of the earth. They offer low penetration into porous surfaces, such as paper or wood, which reduces the quantity of the coating system required to coat such a porous surface and minimized the difference in level of gloss between porous and non-porous surfaces. The radiation curable coating compositions of this invention can also be used in making thick coatings that have good spreadability and high texture retention capabilities.

The radiation curable coating compositions of this invention also offer good storage stability which is important in many applications, such as inks. They additionally offer low shrinkage, high shear resistance and low rheological variation with temperature changes. Like conventional radiation curable coatings, they are also inert and environmentally friendly by virtue of being free of volatile organic solvents.

This invention more specifically discloses a radiation curable coating composition which is comprised of (1) a crosslinked polymeric resin which is comprised of repeat units which are derived from (a) at least one member selected from the group consisting of acrylate monomers and vinyl aromatic monomers and (b) a crosslinking monomer; (2) an acrylate diluting monomer; and (3) a photocatalyst.

The subject invention further discloses a process for coating a three-dimensional substrate which comprises applying a radiation curable coating composition to the surface of the substrate and subsequently exposing the surface of the substrate to radiation to cure the coating onto the surface of the substrate, wherein the radiation curable coating composition which is comprised of (1) a crosslinked polymeric resin which is comprised of repeat units which are derived from (a) at least one member selected from the group consisting of acrylate monomers and vinyl aromatic monomers and (b) a crosslinking monomer; (2) an acrylate diluting monomer; and (3) a photocatalyst.

The present invention also reveals a process for coating a surface on a substrate which comprises applying a radiation curable coating composition to the surface of the substrate and subsequently exposing the surface of the substrate to radiation to cure the coating onto the surface of the substrate, wherein the surface of the substrate is oriented in a position which is not horizontal to the surface of the earth, and wherein the radiation curable coating composition which is comprised of (1) a crosslinked polymeric resin which is comprised of repeat units which are derived from (a) at least one member selected from the group consisting of acrylate monomers and vinyl aromatic monomers and (b) a crosslinking monomer; (2) an acrylate diluting monomer; and (3) a photocatalyst.

DETAILED DESCRIPTION OF THE INVENTION

The radiation curable coating compositions of this invention are comprised of (1) a crosslinked polymeric resin which is comprised of repeat units which are derived from (a) at least one member selected from the group consisting of acrylate monomers and vinyl aromatic monomers and (b) a crosslinking monomer; (2) an acrylate diluting monomer; and (3) a photocatalyst.

The crosslinked polymeric resin will typically be comprised of repeat units which are derived from (a) an acrylic and/or a vinyl aromatic monomer and (b) a crosslinking monomer. About 0.001 phm (parts per 100 parts of monomer) to about 5 phm of the crosslinking monomer is copolymerized with the acrylic and/or vinyl aromatic monomer in synthesizing the crosslinked polymeric resin. It is generally preferred for 0.01 phm to 3 phm of the crosslinking monomer to be copolymerized into polymeric resin. It is normally most preferred for 0.2 phm to 1 phm of the crosslinking monomer to be copolymerized into polymeric resin.

The acrylate monomers that can be used in synthesizing the crosslinked polymeric resin include alkyl acrylate monomers and alkyl methacrylate monomers. The alkyl acrylate monomers that can be used in the crosslinked polymers used in the radiation curable coating formulations of this invention are generally of the structural formula:

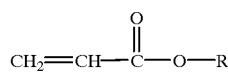

wherein R represents an alkyl group containing from 1 to 10 carbon atoms. The alkyl group in such alkyl acrylate monomers will preferably contain from 2 to 8 carbon atoms with alkyl groups which contain 8 carbon atoms being most preferred. Accordingly, ethyl acrylate, propyl acrylate, butyl acrylate, pentyl acrylate, hexyl acrylate and 2-ethyl hexyl acrylate are preferred alkyl acrylates. The alkyl groups in such alkyl acrylate monomers can be straight chained or branched. Thus, normal-propyl acrylate, isopropyl acrylate, normal-butyl acrylate or tertiary-butyl acrylate can be employed.

The alkyl methacrylate monomers that can be used have the structural formula:

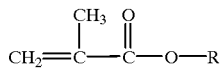

wherein R represents an alkyl group containing from 1 to 10 carbon atoms (R=$C_nH_{2n+}$ with n being an integer from 1 to 8). The alkyl groups in such alkyl methacrylate monomers can be straight chained or branched. Methyl methacrylate, ethyl methacrylate, propyl methacrylate, isobutyl methacrylate and n-butyl methacrylate are representative examples of alkyl methacrylate monomers which can be used. The alkyl group in the alkyl methacrylate monomer will preferably contain from 1 to 4 carbon atoms with alkyl groups which contain 4 carbon atoms being most preferred. Accordingly, isobutyl methacrylate is a highly preferred monomer.

The vinyl aromatic monomers that can be used in synthesizing the radiation curable coating compositions of this invention include all of those which are known to polymerize in free radical systems. Such vinyl aromatic monomers typically contain from 8 to 20 carbon atoms. Usually, the vinyl aromatic monomer will contain from 8 to 14 carbon atoms. Some representative examples of vinyl aromatic monomers that can be utilized include styrene, 1-vinyl napthalene, 2-vinyl napthalene, 3-methyl styrene, 4-propyl styrene, 4-cyclohexyl styrene, 4-dodecyl styrene, 2-ethyl-4-benzyl styrene, 4-(phenylbutyl) styrene, and the like. Styrene, para-methyl styrene, para-tertiary butyl styrene and mixtures of para-methyl styrene and ortho-methyl styrene are generally the most preferred vinyl aromatic monomers.

A wide variety of crosslinking monomers can be utilized in making the crosslinked radiation curable coating formulations of this invention. Virtually any monomer that is copolymerizable with the acrylate monomer and/or vinyl aromatic monomer that introduces crosslinks into the polymer can be used as the crosslinking monomer. Some representative examples of crosslinking monomers that can be utilized include difunctional acrylates, difunctional methacrylates, trifunctional acrylates, trifunctional methacrylates, 1,4-butanediol dimethacrylate, divinyl benzene, and the like.

The crosslinked polymeric resin is typically synthesized by utilizing a free radical emulsion polymerization process. Essentially any type of free radical generator can be used to initiate such free radical emulsion polymerizations. For example, free radical generating chemical compounds, ultraviolet light or radiation can be used. In order to ensure a satisfactory polymerization rate, uniformity and a controllable polymerization, free radical generating chemical agents which are water-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, 4,4'azobis(4-cyanovaleric acid), azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis-(t-butylperoxy)butyrate, 1,1-di-(t-butylperoxy) cyclohexane, and the like. Persulfate initiators, such as potassium persulfate and ammonium persulfate, are especially useful in such aqueous emulsion polymerizations.

The amount of initiator employed will vary with the desired resin being synthesized. However, as a general rule, from 0.005 to 1 phm (parts by weight per 100 parts by weight of monomer) of the initiator will be included in the reaction mixture. In most cases, from 0.1 phr to 0.5 phm metal sulfate initiators will be employed in the polymerization medium.

The emulsifiers used in synthesizing the crosslinked polymeric resin may be charged at the outset of the polymerization or may be added incrementally or proportionately as the polymerization reaction proceeds. A wide variety of types of emulsifiers or surfactants, such as anionic, cationic, nonionic and amphoteric emulsifiers, can be utilized in the process of this invention. Rosin acid or fatty acid emulsifiers are normally utilized.

Synthetic surfactants can also be used. For instance, salts of alkyl sulfates, alkyl sulfonates and alkyl phosphates can be employed as the emulsifier. The alkyl groups in these compounds generally contain from 1 to 30 carbon atoms. Normally, the alkyl groups in these surfactants will contain from 8 to 20 carbon atoms. The surfactant utilized will normally be a sodium, potassium, magnesium or ammonium salt. Sodium lauryl sulfate, ammonium lauryl sulfate, sodium dodecyl benzene sulfonate and sodium dodecyl sulfate are some representative examples of highly suitable emulsifiers.

Generally, from about 1.5 phm to about 7 phm of emulsifier is utilized in preparing the aqueous polymerization medium. In most cases, it will be preferred to utilize from about 4 phm to 6.5 phm of emulsifier. It is normally more preferred to utilize from about 5.5 phm to about 6.5 phm of the emulsifier. The precise amount of emulsifier required in order to attain optimal results will, of course, vary with the specific emulsifier being used. However, persons skilled in the art will be able to easily ascertain the specific amount of emulsifier required in order to attain optimal results.

The free radical emulsion polymerization will typically be conducted at a temperature which is within the range of about 20° C. to about 95° C. It is generally preferred for the polymerization to be carried out at a temperature which is within the range of 30° C. to about 80° C. It is typically more preferred to utilize a polymerization temperature which is within the range of about 45° C. to about 70° C. To increase conversion levels, it can be advantageous to increase the temperature as the polymerization proceeds. For instance, it is desirable for the polymerization temperature to be maintained at about 45° C. at the beginning of the polymerization and increased to a final temperature of about 70° C. at the end of the polymerization. After the polymerization has been completed, the resin can be recovered from the latex by using standard coagulation and drying techniques.

Some representative examples of acrylate diluting monomers that can be used in the radiation curable coating compositions of this invention include: acrylated epoxy soya oil, bisphenol A epoxy diacrylate, epoxy acrylate/monomer blends, acrylated epoxy linseed oil, nonyl phenol ethoxylate, 2-phenoxy ethyl acrylate, phenol ethoxylate monoacrylate, lauryl acrylate, hexadecyl acrylate, stearyl acrylate, nonyl phenol propoxylate (2.5) monoacrylate, myristyl acrylate, 1,6-hexanediol diacrylate, bisphenol A ethoxylate diacrylate, polyethylene glycol 200 diacrylate, tripropylene glycol diacrylate, neopentyl glycol propoxylate diacrylate, neopentyl glycol ethoxylate diacrylate, aliphatic ethoxylate diacrylate, aliphatic diacrylate, dipropylene glycol diacrylate, bisphenol A ethoxylate diacrylate, 1,6-hexanediol ethoxylate diacrylate, 1,6-hexanediol propoxylate diacrylate, trimethylolpropane triacrylate, trimethylolpropane propoxylate triacrylate, trimethylolpropane ethoxylate triacrylate, aliphatic diacrylate, ditrimethylolpropane tetraacrylate, dipentaerythritol pentaacrylate, aliphatic amine acrylate, aliphatic amine acrylate, tripropylene glycol diacrylate, glyceryl propoxylate triacrylate, trimethylolpropane propoxylate triacrylate, trimethylolpropane ethoxylate triacrylate, trimethylolpropane triacrylate, ditrimethyolpropane pentaacrylate, aliphatic urethane triacrylate, aliphatic urethane diacrylate, aromatic urethane hexaacrylate, aliphatic urethane diacrylate, aliphatic urethane triacrylate, aromatic urethane diacrylate, monomethoxy trimethylolpropane ethoxylate diacrylate, tripropylene glycol diacrylate, and the like.

The photocatalysts that can be used in the radiation curable coating compositions of this invention include: benzophenone, benzil dimethyl ketal, liquid benzophenone, benzophenone derivatives, acyl substituted phosphine oxides, amino alkyl phenones, benzoate derivatives, benzoin, benzoin ethers, hydroxy alkyl phenones, titanocenes diaryliodonium salts, ferrocenium complexes, triarylsulphonium salts, triphenyl sulphonium, and the like.

The radiation curable coating compositions of this invention are made by simply admixing the crosslinked polymeric resin, acrylate diluting monomer and the photocatalyst. Normally, the radiation curable coating composition will be a clear varnish. However, it is possible to add various pigments to the composition to impart color. Titanium dioxide is an example of a widely used pigment which imparts hiding power and a white color. Mineral pigments (such as oxides of iron and chromium), organic pigments (such as phthalocyanine) and active anticorrosive pigments (such as zinc phosphate) are representative examples of other widely used pigments. In cases where pigments are added to the radiation curable coating composition, it will normally require more exposure to a radiation source to cure the coating composition.

The radiation curable coating compositions of this invention can be used to coat a wide variety of substrates including plastic, glass, textile fabrics, leather, metal, paper, wood, and the like. For instance, they can be used to coat magazine covers, credit cards, compact disks, furniture, electronic equipment, magnetic tape, cardboard, food packaging, cosmetics packaging, and the like. The radiation curable coating formulations of this invention offer a number of important advantages. For instance, the radiation curable coating system of this invention offer excellent sag resistance and can be applied to three-dimensional substrates or to substrates that are in an orientation that is non-horizontal or even vertical with respect to the surface of the earth. They offer low penetration into porous surfaces, such as paper or wood, which reduces the quantity of the coating system required to coat such a porous surface and reduces differences in the level of gloss between porous and non-porous surfaces. The radiation curable coating compositions of this invention can also be used in making thick coatings that have good spreadability and high texture retention capabilities. For instance, the radiation curable coating compositions of this invention can be applied to a thickness of 200 microns to as much as about 300 microns. The radiation curable coating compositions of this invention will normally be applied to a thickness of about 4 microns to about 300 microns.

The radiation curable coating compositions of this invention also offer good storage stability which is important in many applications, such as inks. They additionally offer low shrinkage, high shear resistance and low rheological variation with temperature changes. Like conventional radiation curable coatings, they are also inert and environmentally friendly by virtue of being free of volatile organic solvents.

After being applied to the substrate, the radiation curable coating is cured by being exposed to ultra-violet light having a frequency of about $10^{15}$ Hz to about $10^{17}$ Hz or electron beams. The use of such radiation provides a high degree of control over the curing process. The radiation generates highly reactive chemical species that initiate polymerization and cures the coating formulation. In cases where the coating composition contains a pigment, electron beams are preferred to cure the composition because they are more capable of penetrating coating compositions that contain pigments than is ultra-violet light. However, in the case of non-pigmented radiation curable coating compositions, it is normally preferred to use ultra-violet light to cure the composition because ultra-violet light sources are much less expensive than sources of electron beams. Clear radiation curable coating formulations will normally be cured by being exposed to an ultra-violet source having an intensity of about 80 to 120 W/cm at a rate of about 2 meters per minute.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, a radiation curable coating formulation was prepared by blending 80 parts by weight of 1,6-hexanediol diacrylate, 20 parts by weight of Plioway® G20 pre-crosslinked vinyl acrylate copolymer (CAS No. 172201-26-2) and 5 parts by weight of benzophenone (as a 10 percent solution in dichloromethane). The radiation curable coating composition was then applied to a paper surface that was non-horizontal in orientation to the surface of the earth. The coating which was about 4 microns thick was then cured onto the substrate by exposing it to ultra-violet light that was provided by an ultra-violet lamp having an intensity of 80 W/cm. A high gloss coating was formed with no evidence of running or sagging.

EXAMPLE 2

The procedure utilized in Example 1 was repeated in this experiment except that the coating was applied at a thickness of about 36 microns using a device that created a textured surface. Again, there was no evidence of running or sagging and the surface maintained the desired texture.

While certain representative embodiments and details have been shown for the purpose of illustrating the subject invention, it will be apparent to those skilled in this art that various changes and modifications can be made therein without departing from the scope of the subject invention.

What is claimed is:

1. A radiation curable coating composition which is comprised of, based upon the total weight of the radiation curable coating composition, (1) about 3 weight percent to about 30 weight percent of a crosslinked polymeric resin comprised of repeat units which are derived from (a) a vinyl aromatic monomer, and (b) a crosslinking monomer, wherein the crosslinked polymeric resin contains from about 0.001 weight percent to about 5 weight percent of the crosslining monomer; (2) about 55 weight percent to about 92 weight percent of an acrylate diluting monomer, wherein the acrylate diluting monomer is selected from the group consisting of acrylated epoxy soya oil, bisphenol A epoxy diacrylate, epoxy acrylate/monomer blends, acrylated epoxy linseed oil, nonyl phenol ethoxylate, 2-phenoxy ethyl acrylate, phenol ethoxylate monoacrylate, lauryl acrylate, hexadecyl acrylate, stearyl acrylate, nonyl phenol propoxylate (2.5) monoacrylate, myristyl acrylate, 1,6-hexanediol diacrylate, bisphenol A ethoxylate diacrylate, polyethylene glycol 200 diacrylate, tripropylene glycol diacrylate, neopentyl glycol propoxylate diacrylate, neopentyl glycol ethoxylate diacrylate, aliphatic ethoxylate diacrylate, aliphatic diacrylate, dipropylene glycol diacrylate, bisphenol A ethoxylate diacrylate, 1,6-hexanediol ethoxylate diacrylate, 1,6-hexanediol propoxylate diacrylate, trimethylolpropane triacrylate, trimethylolpropane propoxylate triacrylate, trimethylolpropane ethoxylate triacrylate, aliphatic diacrylate, ditrimethylolpropane tetraacrylate, dipentaerythitol pentaacrylate, aliphatic amine acrylate, aliphatic amine acrylate, tripropylene glycol diacrylate, glyceryl propoxylate triacrylate, trimethylolpropane propoxylate triacrylate, trimethylolpropane ethoxylate triacrylate, trimethylolpropane triacrylate, ditrimethyolpropane pentaacrylate, aliphatic urethane triacrylate, aliphatic urethane diacrylate, aromatic urethane hexaacrylate, aliphatic urethane diacrylate, aliphatic urethane triacrylate, aromatic urethane diacrylate, monomethoxy trimethylolpropane ethoxylate diacrylate and tripropylene glycol diacrylate; and (3) about 5 weight percent to about 20 weight percent of a photocatalyst, wherein the photocatalyst is selected from the group consisting of benzophenone, benzil dimethyl ketal, liquid benzophenone, benzophenone derivatives, acyl substituted phosphine oxides, amino alkyl phenones, benzoate derivatives, benzoin, benzoin ethers, hydroxy alkyl phenones, titanocenes diaryliodonium salts, ferrocenium complexes, triarylsulphonium salts and triphenyl sulphonium.

2. A radiation curable coating composition as specified in claim 1 wherein the acrylate diluting monomer is 1,6-hexanediol diacrylate.

3. A radiation curable coating composition as specified in claim 2 wherein the photocatalyst is benzophenone.

4. A radiation curable coating composition as specified in claim 3 wherein the crosslinked polymeric resin cont sfrom 0.2 weight percent to 1 weight percent of the crosslinking monomer.

5. A radiation curable coating composition which is comprised of, based upon the total weight of the radiation curable coating composition, (1) about 3 weight percent to about 30 weight percent of a crosslinked polymeric resin comprised of repeat units which are derived from (a) an alkyl acrylate monomer selected from the group consisting of ethyl acrylate, propyl acrylate, butyl acrylate, pentyl acrylate, hexyl acrylate and 2-ethyl hexyl acrylate, and (b) a crosslining monomer, wherein the crosslinked polymeric resin contains from about 0.001 weight percent to about 5 weight percent of the crosslinking monomer; (2) about 55 weight percent to about 92 weight percent of an acrylate diluting monomer, wherein the acrylate diluting monomer is selected from the group consisting of acrylated epoxy soya oil, bisphenol A epoxy diacrylate, epoxy acrylate/monomer blends, acrylated epoxy linseed oil, nonyl phenol ethoxylate, 2-phenoxy ethyl acrylate, phenol ethoxylate monoacrylate, lauryl acrylate, hexadecyl acrylate, stearyl acrylate, nonyl phenol propoxylate (2.5) monoacrylate, myristyl acrylate, 1,6-hexanediol diacrylate, bisphenol A ethoxylate diacrylate, polyethylene glycol 200 diacrylate, tripropylene glycol diacrylate, neopentyl glycol propoxylate diacrylate, neopentyl glycol ethoxylate diacrylate, aliphatic ethoxylate diacrylate, aliphatic diacrylate, dipropylene glycol diacrylate, bisphenol A ethoxylate diacrylate, 1,6-hexanediol ethoxylate diacrylate, 1,6-hexanediol propoxylate diacrylate, trimethylolpropane triacrylate, trimethylolpropane propoxylate triacrylate, trimethylolpropane ethoxylate triacrylate, aliphatic diacrylate, ditrimethylolpropane tetraacrylate, dipentaerythritol pentaacrylate, aliphatic amine acrylate, aliphatic amine acrylate, tripropylene glycol diacrylate, glyceryl propoxylate triacrylate, trimethylolpropane propoxylate triacrylate, trimethylolpropane ethoxylate triacrylate, trimethylolpropane triacrylate, ditrimethyolpropane pentaacrylate, aliphatic urethane triacrylate, aliphatic urethane diacrylate, aromatic urethane hexaacrylate, aliphatic urethane diacrylate, aliphatic urethane triacrylate, aromatic urethane diacrylate, monomethoxy trimethylolpropane ethoxylate diacrylate and tripropylene glycol diacrylate; and (3) about 5 weight percent to about 20 weight percent of a photocatalyst, wherein the photocatalyst is selected from the group consisting of benzophenone, benzil dimethyl ketal, liquid benzophenone, benzophenone derivatives, acyl substituted phosphine oxides, amino alkyl phenones, benzoate derivatives, benzoin, benzoin ethers, hydroxy alkyl phenones, titanocenes diaryliodonium salts, fercocenium complexes, triarylsulphonium salts and triphenyl sulphonium.

6. A radiation curable coating composition which is comprised of, based upon the total weight of the radiation curable coating composition, (1) about 3 weight percent to about 30 weight percent of a crosslinked polymeric resin comprised of repeat units which are derived from (a) an alkyl methacrylate monomer selected from the group consisting of methyl methacrylate, ethyl methacrylate, propyl methacrylate, isobutyl methacrylate and n-butyl methacrylate, and (b) a crosslining monomer, wherein the crosslinked polymeric resin contains from about 0.001 weight percent to about 5 weight percent of the crosslinking monomer; (2) about 55 weight percent to about 92 weight percent of an acrylate diluting monomer, wherein the acrylate diluting monomer is selected from the group consisting of acrylated epoxy soya oil, bisphenol A epoxy diacrylate, epoxy acrylate/monomer blends, acrylated epoxy linseed oil, nonyl phenol ethoxylate, 2-phenoxy ethyl acrylate, phenol ethoxylate monoacrylate, lauryl acrylate, hexadecyl acrylate, stearyl acrylate, nonyl phenol propoxylate (2.5) monoacrylate, myristyl acrylate, 1,6-hexanediol diacrylate, bisphenol A ethoxylate diacrylate, polyethylene glycol 200 diacrylate, tripropylene glycol diacrylate, neopentyl glycol propoxylate diacrylate, neopentyl glycol ethoxylate diacrylate, aliphatic ethoxylate diacrylate, aliphatic diacrylate, dipropylene glycol diacrylate, bisphenol A ethoxylate diacrylate, 1,6-hexanediol ethoxylate diacrylate, 1,6-hexanediol propoxylate diacrylate, trimethylolpropane triacrylate, trimethylolpropane propoxylate triacrylate, trimethylolpropane ethoxylate triacrylate, aliphatic diacrylate, ditrimethylolpropane tetraacrylate, dipentaerythritol pentaacrylate, aliphatic amine acrylate, aliphatic amine acrylate, tripropylene glycol diacrylate, glyceryl propoxylate triacrylate, trimethylolpropane propoxylate triacrylate, trimethylolpropane ethoxylate triacrylate, trimethylolpropane triacrylate, ditrimethyolpropane pentaacrylate, aliphatic urethane triacrylate, aliphatic urethane diacrylate, aromatic urethane hexaacrylate, aliphatic urethane diacrylate, aliphatic urethane triacrylate, aromatic urethane diacrylate, monomethoxy trimethylolpropane ethoxylate diacrylate and tripropylene glycol diacrylate; and (3) about 5 weight percent to about 20 weight percent of a photocatalyst, wherein the photocatalyst is selected from the group consisting of benzophenone, benzil dimethyl ketal, liquid benzophenone, benzophenone derivatives, acyl substituted phosphine oxides, amino alkyl phenones, benzoate derivatives, benzoin, benzoin ethers, hydroxy alkyl phenones, titanocenes diaryliodonium salts, ferrocenium complexes, triarylsulphonium salts and triphenyl sulphonium.

7. A radiation curable coating composition as specified in claim 1 wherein the vinyl aromatic monomer is selected from the group consisting of styrene, ortho-methyl styrene, para-methyl styrene and para-tertiary-butyl styrene.

8. A radiation curable coating composition as specified in claim 5 wherein the crosslinked polymeric resin contains from 0.01 weight percent to 3 weight percent of the crosslinking monomer.

9. A radiation curable coating composition as specified in claim 8 wherein the acrylate diluting monomer is 1,6-hexanediol diacrylate.

10. A radiation curable coating composition as specified in claim 9 wherein the photocatalyst is benzophenone.

11. A radiation curable coating composition as specified in claim 10 wherein the crosslinked polymeric resin contains from 0.2 weight percent to 1 weight percent of the crosslinking monomer.

12. A radiation curable coating composition as specified in claim 6 wherein the crosslinked polymeric resin contains from 0.01 weight percent to 3 weight percent of the crosslinking monomer.

13. A radiation curable coating composition as specified in claim 12 wherein the acrylate diluting monomer is 1,6-hexanediol diacrylate.

14. A radiation curable coating composition as specified in claim 13 wherein the photocatalyst is benzophenone.

15. A radiation curable coating composition as specified in claim 14 wherein the crosslinked polymeric resin contains from 0.2 weight percent to 1 weight percent of the crosslinking monomer.

* * * * *